(12) United States Patent
Plauché et al.

(10) Patent No.: US 12,334,066 B2
(45) Date of Patent: Jun. 17, 2025

(54) EMOTIONALLY INTELLIGENT RESPONSES TO INFORMATION SEEKING QUESTIONS

(71) Applicant: Google LLC, Mountain View, CA (US)

(72) Inventors: Madelaine Plauché, Oakland, CA (US); Kate Beryl Berman, New York, NY (US)

(73) Assignee: Google LLC, Mountain View, CA (US)

( * ) Notice: Subject to any disclaimer, the term of this patent is extended or adjusted under 35 U.S.C. 154(b) by 290 days.

(21) Appl. No.: 17/655,544

(22) Filed: Mar. 18, 2022

(65) Prior Publication Data

US 2023/0298580 A1    Sep. 21, 2023

(51) Int. Cl.

| | | |
|---|---|---|
| G10L 15/22 | (2006.01) | |
| G06F 16/632 | (2019.01) | |
| G06F 16/683 | (2019.01) | |
| G10L 13/10 | (2013.01) | |
| G10L 15/26 | (2006.01) | |
| G10L 15/30 | (2013.01) | |
| G10L 25/63 | (2013.01) | |

(52) U.S. Cl.
CPC ............ *G10L 15/22* (2013.01); *G06F 16/632* (2019.01); *G06F 16/685* (2019.01); *G10L 13/10* (2013.01); *G10L 15/26* (2013.01); *G10L 15/30* (2013.01); *G10L 25/63* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 7,783,486 B2 * | 8/2010 | Rosser | ................... | G10L 13/00 |
| | | | | 704/270.1 |
| 9,812,151 B1 * | 11/2017 | Amini | ................... | G06T 13/40 |
| 11,551,663 B1 * | 1/2023 | Bissell | ................... | G06F 3/167 |
| 2006/0122840 A1 * | 6/2006 | Anderson | ............. | G10L 13/033 |
| | | | | 704/E15.04 |
| 2008/0096533 A1 | 4/2008 | Manfredi et al. | | |
| 2010/0036660 A1 | 2/2010 | Bennett | | |

(Continued)

OTHER PUBLICATIONS

Suraj D M et al., Conversational assistant based on sentiment analysis, Published Sep. 2019.

(Continued)

*Primary Examiner* — Shaun Roberts
(74) *Attorney, Agent, or Firm* — Honigman LLP; Brett A. Krueger; Grant Griffith

(57) ABSTRACT

A method for generating emotionally intelligent responses to information seeking questions includes receiving audio data corresponding to a query spoken by a user and captured by an assistant-enabled device associated with the user, and processing, using a speech recognition model, the audio data to determine a transcription of the query. The method also includes performing query interpretation on the transcription of the query to identify an emotional state of the user that spoke the query, and an action to perform. The method also includes obtaining a response preamble based on the emotional state of the user and performing the identified action to obtain information responsive to the query. The method further includes generating a response including the obtained response preamble followed by the information responsive to the query.

16 Claims, 7 Drawing Sheets

(56) References Cited

U.S. PATENT DOCUMENTS

| | | | |
|---|---|---|---|
| 2016/0180038 A1* | 6/2016 | Clark | G06F 16/3334 |
| | | | 706/12 |
| 2016/0210963 A1* | 7/2016 | Kim | G10L 15/1822 |
| 2017/0352350 A1* | 12/2017 | Booker | G10L 15/22 |
| 2018/0090137 A1* | 3/2018 | Horling | G06F 16/9535 |
| 2018/0357286 A1* | 12/2018 | Wang | G06F 16/3329 |
| 2019/0325895 A1 | 10/2019 | Bromand et al. | |
| 2020/0050306 A1* | 2/2020 | Tan | G06F 9/451 |
| 2020/0104369 A1 | 4/2020 | Bellegarda | |
| 2020/0233908 A1 | 7/2020 | Abe et al. | |
| 2022/0130413 A1* | 4/2022 | K R | G10L 15/22 |

OTHER PUBLICATIONS

Zhaoxi Mu et al.: "Review of end-to-end speech synthesis technology based on deep learning", Arvix.Org, Cornell University Library, 201 Olin Library Cornell University Ithaca, NY 14853, Apr. 20, 2021 (Apr. 20, 2021), XP081941258.

Sarath Sivaprasad et al.: "Emotional Prosody Control for Speech Generation", Arvix.Org, Cornell University Library, 201 Olin Library Cornell University Ithaca, NY 14853, Nov. 7, 2021 (Nov. 7, 2021), XP091095766.

International Search Report and Written Opinion issued in related PCT Application No. PCT/US2023/063993, dated May 30, 2023.

* cited by examiner

EMOTIONALLY INTELLIGENT RESPONSES TO INFORMATION SEEKING QUESTIONS

TECHNICAL FIELD

This disclosure relates to emotionally intelligent responses to information seeking questions.

BACKGROUND

A speech-enabled environment permits a user to speak a query aloud and a digital assistant will perform an action to obtain an answer to the query. Particularly when interacting with an assistant-enabled device via voice, the user may seek an emotional connection or acknowledgment from the assistant-enabled device. It may therefore be advantageous for the assistant-enabled device to identify an emotional need based on the voice query. In some instances, identifying the emotional need requires a determination that one or more words in the voice query indicate an emotional need of the user. Consequently, a digital assistant that receives a query must have some way of identifying an emotional need of the user that spoke the query. Moreover, the digital assistant needs to identify an emotionally intelligent response to the query that satisfies an emotional need as well as an informational need of the user.

SUMMARY

One aspect of the disclosure provides a method of generating emotionally intelligent responses to information seeking questions. The method includes receiving audio data corresponding to a query spoken by a user and captured by an assistant-enabled device associated with the user, and processing, using a speech recognition model, the audio data to determine a transcription of the query. The method also includes performing query interpretation on the transcription of the query to identify an emotional state of the user that spoke the query, and an action to perform. The method further includes obtaining a response preamble based on the emotional state of the user, performing the identified action to obtain information responsive to the query, and generating a response including the obtained response preamble followed by the information responsive to the query.

Implementations of the disclosure may include one or more of the following optional features. In some implementations, performing the identified action to obtain the information responsive to the query further includes querying a search engine using one or more terms in the transcription to obtain the information responsive to the query. In some examples, the method further includes obtaining a prosody embedding based on the identified emotional state of the user that spoke the query, and converting, using a text-to-speech (TTS) system, a textual representation of the emotionally intelligent response into synthesized speech having a target prosody specified by the prosody embedding. Here, performing query interpretation on the transcription of the query further includes identifying a severity of the emotional state of the user, and obtaining the prosody embedding is further based on the severity of the emotional state of the user.

In some implementations, obtaining the response preamble based on the emotional state of the user further includes querying, using the identified emotional state of the user, a preamble datastore including a set of different preambles Here, each preamble in the set of different preambles maps to a different emotional state. In some examples obtaining the response preamble based on the emotional state of the user further includes generating, using a preamble generator configured to receive the emotional state of the user as input, a preamble mapped to the emotional state of the user.

In some implementations, obtaining a response preamble based on the emotional state of the user further includes determining whether the emotional state of the user indicates an emotional need. In these implementations, determining whether the emotional state of the user includes an emotional need is based on the content of the query Additionally or alternatively, determining whether the emotional state of the user includes an emotional need further includes determining whether the emotional state of the user is associated with an emotion category. In some implementations the method further includes, when the identified emotional state of the user does not indicate an emotional need, generating the response without obtaining the response preamble.

Another aspect of the disclosure provides a system for generating emotionally intelligent responses to information seeking questions. The system includes data processing hardware and memory hardware in communication with the data processing hardware. The memory hardware stores instructions that when executed on the data processing hardware cause the date processing hardware to perform operations including receiving audio data corresponding to a query spoken by a user and captured by an assistant-enabled device associated with the user, and processing, using a speech recognition model, the audio data to determine a transcription of the query. The operations also include performing query interpretation on the transcription of the query to identify an emotional state of the user that spoke the query, and an action to perform. The operations further include obtaining a response preamble based on the emotional state of the user, performing the identified action to obtain information responsive to the query, and generating a response including the obtained response preamble followed by the information responsive to the query.

This aspect may include one or more of the following optional features. In some implementations, performing the identified action to obtain the information responsive to the query further includes querying a search engine using one or more terms in the transcription to obtain the information responsive to the query. In some examples, the operations further include obtaining a prosody embedding based on the identified emotional state of the user that spoke the query, and converting, using a text-to-speech (TTS) system, a textual representation of the emotionally intelligent response into synthesized speech having a target prosody specified by the prosody embedding. Here, performing query interpretation on the transcription of the query further includes identifying a severity of the emotional state of the user, and obtaining the prosody embedding is further based on the severity of the emotional state of the user.

In some implementations, obtaining the response preamble based on the emotional state of the user further includes querying, using the identified emotional state of the user, a preamble datastore including a set of different preambles. Here, each preamble in the set of different preambles maps to a different emotional state. In some examples obtaining the response preamble based on the emotional state of the user further includes generating, using a preamble generator configured to receive the emotional state of the user as input, a preamble mapped to the emotional state of the user.

In some implementations, obtaining a response preamble based on the emotional state of the user further includes determining whether the emotional state of the user indicates an emotional need. In these implementations, determining whether the emotional state of the user includes an emotional need is based on the content of the query Additionally or alternatively, determining whether the emotional state of the user includes an emotional need further includes determining whether the emotional state of the user is associated with an emotion category. In some implementations the operations further include, when the identified emotional state of the user does not indicate an emotional need, generating the response without obtaining the response preamble.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A user's manner of interacting with an assistant-enabled device is designed to be primarily, if not exclusively, by means of voice input. However, a user's emotional expectations when utilizing voice inputs may be higher than when utilizing text input. Particularly when interacting with an assistant-enabled device via voice, the user may seek an emotional connection or acknowledgment from a digital assistant accessible through the assistant-enabled device. For instance, a user may be experiencing an emotional need, such as anxiety, when interacting with the digital assistant. Due to the personal nature of voice input, the user may expect that the assistant-enabled device perceives the emotional need the user is experiencing and, when providing the response, includes both a competent response and a warm response. For instance, the user may benefit from an answer to the query that includes a preamble that acknowledges, and is empathetic, to the emotions experienced by the user in addition to the informational answer to the query.

In some scenarios, the same query from a user represents more than one need of the user. For instance, a user might query the assistant-enabled device with "I am so excited to go for a bike ride today, what is the weather forecast for this afternoon?" Here, the query may correspond to both an emotional need (e.g., connection) as well as an informational need (e.g., the weather forecast for the user's area). By identifying both of these needs, the assistant-enabled device is able to generate an emotionally intelligent response to the query that addresses both the emotional need of the user and the informational need of the user. For example, the assistant-enabled device may generate a response to the user of "I'm happy to hear that, the weather should be 72 degrees and sunny this afternoon."

Figure 1:
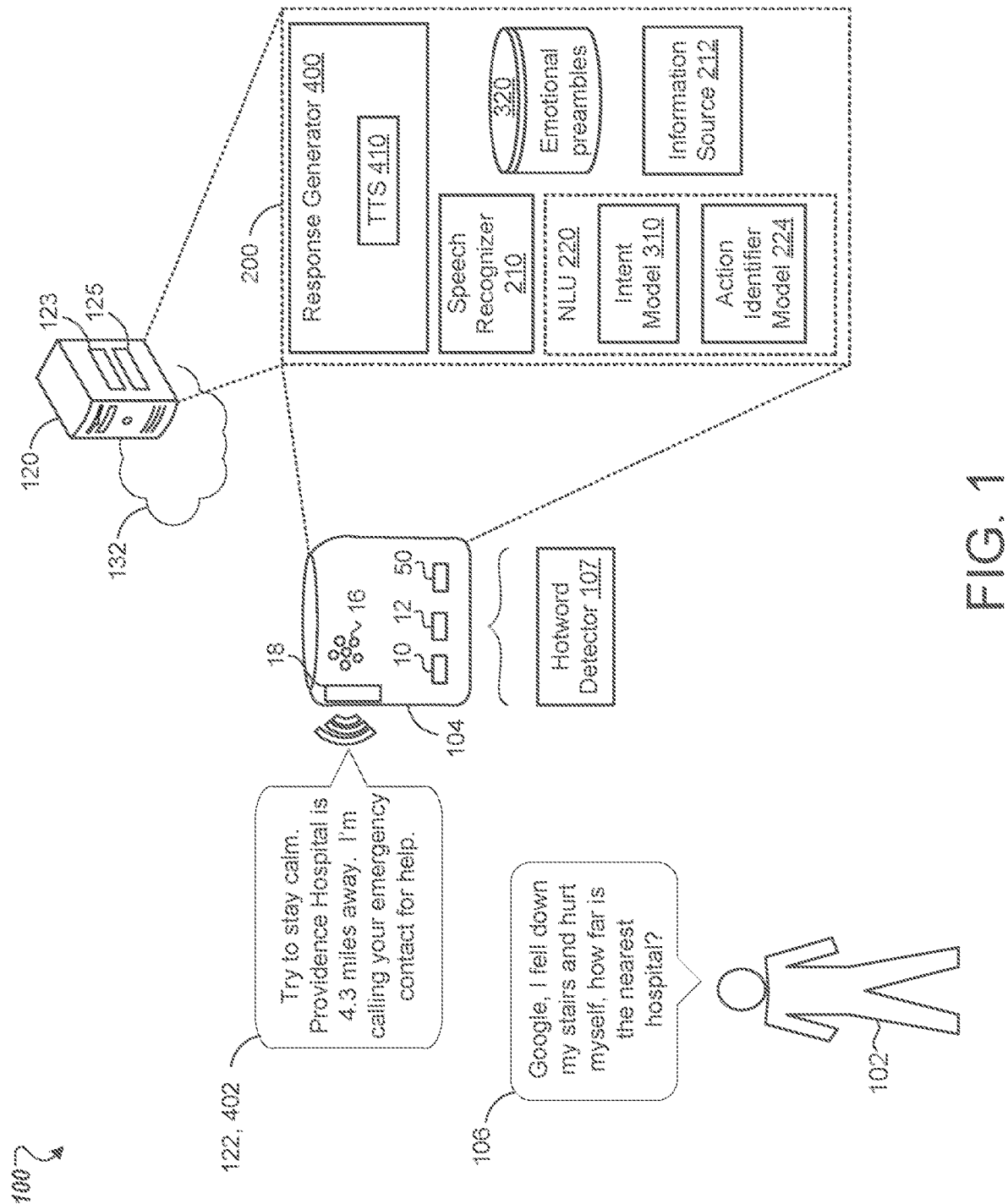
FIG. 1 is a schematic view of an example system including a digital assistant generating emotionally intelligent responses to information seeking questions.

FIG. 1 illustrates an example system 100 including an assistant-enabled device (AED) 104 and/or a remote system 120 in communication with the AED 104 via a network 132. The AED 104 and/or the remote system 120 executes a digital assistant 200 that a user 102 may interact with through speech such that the digital assistant 200 is capable of generating emotionally intelligent responses to information seeking questions received from the user 102. In the example shown, the AED 104 corresponds to a smart speaker. However, the AED 104 can include other computing devices, such as, without limitation, a smart phone, tablet, smart display, desktop/laptop, smart watch, smart appliance, headphones, smart glasses/headset, or vehicle infotainment device. The AED 104 includes data processing hardware 10 and memory hardware 12 storing instructions that when executed on the data processing hardware 10 cause the data processing hardware 10 to perform operations. The remote system 120 (e.g., server, cloud computing environment) also includes data processing hardware 123 and memory hardware 125 storing instructions that when executed on the data processing hardware 123 cause the data processing hardware 123 to perform operations. As described in greater detail below, the digital assistant 200 executing on the AED 104 and/or the remote system 120 executes a speech recognizer 210, response generator 400, and text-to-speech (TTS) system 410, and has access to one or more information sources 212 and a set of emotional preambles 320 stored on the memory hardware 12, 125.

The AED 104 includes an array of one or more microphones 16 configured to capture acoustic sounds such as speech directed toward the AED 104. The AED 104 may also include, or be in communication with, an audio output device (e.g., a speaker) 18 that may output audio such as music and/or synthesized speech 122 from the digital assistant 200. The remote system 120 may be a single computer, multiple computers, or a distributed system (e.g., a cloud environment) having scalable/elastic computing resources 123 (e.g., data processing hardware) and/or storage resources 125 (e.g., memory hardware).

The AED 104 may include a hotword detector 107 configured to detect the presence of a hotword in streaming audio without performing semantic analysis or speech recognition processing on the streaming audio. The AED 104 may include an acoustic feature extractor (not shown) which may be implemented as part of the hotword detector or as a separate component for extracting audio data 202 (FIG. 2) from a query 106. For instance, referring to FIGS. 1 and 2, the acoustic feature extractor may receive streaming audio captured by the one or more microphones 16 of the AED 104 that corresponds to a query 106 spoken by the user 102 and extract the audio data 202. The audio data 202 may include acoustic features such as Mel-frequency cepstrum coefficients (MFCCs) or filter bank energies computed over windows of an audio signal. In the example shown, the query 106 spoken by the user 102 includes "Google, I fell down my stairs and hurt myself, how far is the nearest hospital?"

The hotword detector 107 may receive the audio data 202 to determine whether the query 106 includes a particular hotword (e.g., Google) spoken by the user 102. That is, the hotword detector 107 may be trained to detect the presence of the hotword (e.g., Google) or one or more variants of the hotword (e.g., Hey Google) in the audio data 202 to cause the AED 104 to wake-up from a sleep state or hibernation state and trigger a speech recognizer 210 to perform speech recognition on the hotword and/or one or more other terms that follow the hotword, e.g., a voice query that follows the hotword and specified an action to perform.

Figure 2:
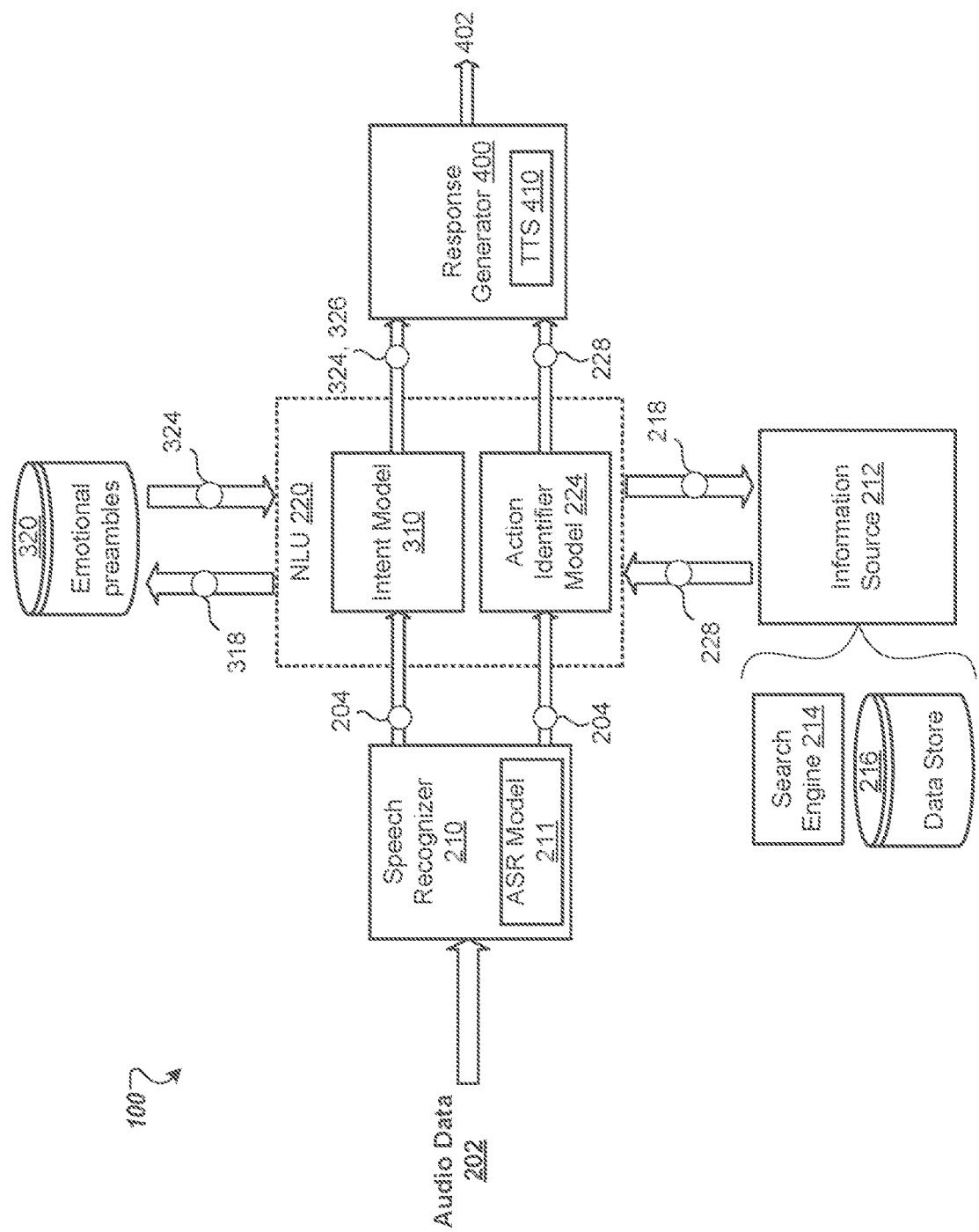
FIG. 2 is a schematic view of example components of the digital assistant.

With continued reference to the system 100 of FIG. 1 and the digital assistant 200 of FIG. 2, the speech recognizer 210 executes an automatic speech recognition (ASR) model 211 (e.g., a speech recognition model 211) that may receive, as input, the audio data 202 and generate/predict, using the speech recognition model 211, a corresponding transcription 204 of the query 106. In the example shown, the one or more words following the hotword in the query 106 and captured in the streaming audio include "I fell down my stairs and hurt myself, how far is the nearest hospital?" that specifies an emotional state 318 (i.e., fear, pain) of the user 102 and an action 218 for the digital assistant 200 to perform to obtain information 228 responsive to the query 106. In response, a response generator 400 generates an emotionally intelligent response 402 including a response preamble 324 followed by the obtained information 228 responsive to the query 106 requesting the nearest hospital to the user 102 to playback for audible output from the speaker 18. The response generator 400 may generate the emotionally intelligent response 402 as a textual representation and use the TTS system 410 to convert the textual representation of the emotionally intelligent response 402 into synthesized speech 122. In the example shown, the digital assistant 200 generates synthesized speech 122 for audible output from the speaker 18 of the AED 104 that says, "Try to stay calm, Providence Hospital is 4.3 miles away. I'm calling your emergency contact for help." As will be discussed in further detail below, the synthesized speech 122 "Try to stay calm" corresponds to the response preamble 324, while the synthesized speech 122 "Providence Hospital is 4.3 miles away" corresponds to the information 228 responsive to the query 106. In some examples, when the AED 104 includes, or is in communication with, a display screen, the digital assistant 200 instructs the AED 104 to display the textual representation of the emotionally intelligent response 402 on the display screen for the user to read in addition to, or in lieu of, generating the synthesized speech 122 representation of the emotionally intelligent response 402.

As shown, the digital assistant 200 may further process, without input from the user 102, a follow up operation such as calling an emergency contact of the user 102. Specifically, the synthesized speech 122 includes "I'm calling your emergency contact for help." Here, the digital assistant 200 performs the action of identifying an emergency contact of the user 102 and initiating a call to the emergency contact. Additionally or alternatively, the digital assistant 200 may output the emotionally intelligent response 402 as a graphical response in addition to outputting the synthesized speech 122 of the emotionally intelligent response. For example, the digital assistant 200 may generate a textual representation of the emotionally intelligent response 402 for display on the screen 50 while also generating the synthesized speech 122 for audible output from the AED 104. In other examples, the AED 104 first seeks approval from the user 102 prior to performing the follow up operation Here, the digital assistant 200 generates synthesized speech "would you like me to call your emergency contact for help?" and waits for the user 102 to provide authorization to call the emergency contact.

Referring to FIG. 2, the digital assistant 200 further includes a natural language understanding (NLU) module 220 configured to perform query interpretation on the corresponding transcription 204 to identify the emotional state 318 of the user 102 that spoke the query 106 and an action 218 specified by the query 106 for the digital assistant 200 to perform. Specifically, the NLU module 220 receives, as input, the corresponding transcription 204 generated by the speech recognizer 210 and performs semantic interpretation on the corresponding transcription 204 to identify the emotional state 318 and the action 218. That is, the NLU module 220 determines a meaning behind the corresponding transcription 204 based on the one or more words in the corresponding transcription 204 for use by the response generator 400 when generating the emotionally intelligent response 402.

The NLU module 220 may include an intent model 310 and an action identifier model 224. The intent model 310 may be configured to identify the emotional state 318 of the user 102 and obtain a response preamble 324 based on the emotional state 318 of the user 102 that addresses the emotional needs of the user 102, while the action identifier model 224 may be configured to identify the action 218 for the digital assistant to perform to obtain information 228 responsive to the query 106. The NLU module 220 may additionally interpret the corresponding transcription 204 to derive a context of the corresponding transcription 204 to determine the meaning behind the corresponding transcription 204, as well as other information about the environment of the user 102 that may be used by the action identifier model 224 to obtain the information 228 responsive to the query 106. For example, if the query 106 processed by the speech recognizer 210 includes a corresponding transcription 204, "I feel so blue when it rains, what is the weather forecast for tomorrow?" the NLU module 220 may perform query interpretation on the corresponding transcription 204 and identify that the user 102 has an emotional state 318 corresponding to a sad and/or depressed emotional state 318, and that the user 102 is seeking the action 218 of looking up the local weather forecast for the following day. Moreover, the NLU module 220 may receive context indicating a location of the user 102 to determine the correct locality for obtaining the weather forecast. The NLU module 220 may parse and tag the corresponding transcription 204 as part of its processing. For example, for the text "I feel so blue when it rains," "blue" may be tagged as an emotional state 318 (i.e., sad and indicating an emotional need), and "weather forecast" may be tagged as an action 218 (i.e., querying a search engine) to be carried out by the AED 104.

In some implementations, the action identifier model 224 of the NLU module 220 performs the identified action 218 to obtain the information 228 responsive to the query 106 by querying an information source 212. The information source 212 may include a data store 216 and/or a search engine 214. The data store 216 may include a plurality of question-answer pairs, where one or more of the questions may correspond to one or more terms in the corresponding transcription 204. In these examples, when the information source 212 identifies a question-answer pair that corresponds to the one or more terms in the corresponding transcription 204, the information source 212 returns the answer to the action identifier model 224 as information 228 responsive to the query 106. The data store 216 may additionally include a respective set of resources associated with the user 102. For example, the data store 216 may include contact information for contacts of the user 102, a personal calendar of the user 102, an e-mail account of the user 102, a music collection of the user 102, and/or user preferences among other resources associated with the user 102.

In some examples, performing the identified action 218 includes querying the search engine 214 using the one or more terms in the corresponding transcription 204 to obtain the information 228 responsive to the query 106. For example, the identified action 218 of obtaining information 228 for "how far is the nearest hospital" for a user 102 may include querying the search engine 214 using the terms "nearest hospital" to obtain information 228 on the nearest hospital to the user 102 in response to the query 106. In some implementations, the action identifier model 224 includes a location of the user 102 when querying the search engine 214 to obtain the information 228 sought by the user 102. The location of the user may be included only when the user explicitly consents to sharing his/her location, which may be revoked at any time by the user 102. Here, the search engine 214 may return a list of hospitals in closest proximity to the user 102, but only return the closest hospital (i.e., Providence Hospital is 4.3 miles away) as the information 228 responsive to the query 106.

Figure 3:
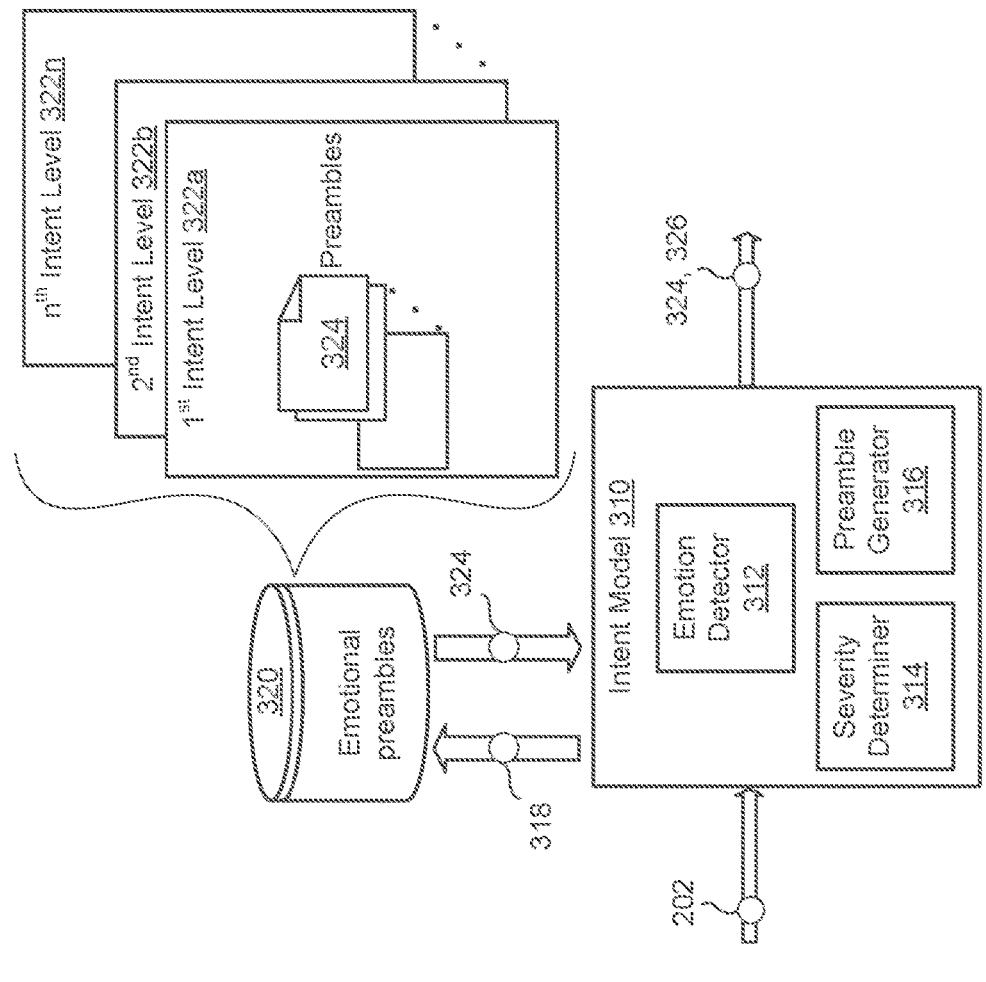
FIG. 3 is a schematic view of an intent detection process.

FIG. 3 includes an example intent detection process 300 for identifying the emotional state 318 of the user 102 that spoke the query 106 and obtaining a response preamble 324 based on the emotional state 318 of the user 102. The intent model 310 may include an emotion detector 312 configured to detect the emotional state 318 based on one or more words in the corresponding transcription 204, a severity determiner 314 configured to process the detected emotional state 318 and determine an severity level of the emotional state 318, and a preamble generator 316 configured to receive the emotional state 318 of the user 102 and generate a response preamble 324 based on the emotional state 318 of the user 102. In some implementations, the preamble generator 316 queries an emotional preambles data store 320 using the emotional state 318 of the user 102, where the emotional preambles data store 320 returns a response preamble 324 to the intent model 310.

The emotional preambles data store 320 stores includes sets of different response preambles 324 for one or more intent level categories 322, 322a-n. That is, each intent level category 322 may include a respective set of response preambles 324 relevant to the intent category 322. Some response preambles 324 may be shared by two or more of the intent level categories 322. In some implementations, the emotion detector 312 determines that the emotional state 318 of the user 102 includes an emotional need by determining that the emotional state 318 is associated with an emotion category corresponding to an intent level category 322 in the emotional preambles data store 320. Here, each intent level category 322 may correspond to a different emotion category (e.g., happiness, sadness, fear, surprise, anger, anxiety) and may include a respective set of response preambles 324 corresponding to the emotion category. For example, the emotional state 318 of lonely may be included in the intent level category 322 corresponding to the emotion category for sadness, which includes the response preambles 324 "Let's find someone for you to talk to," "I'm sorry to hear that." and "It's going to be okay." Here, the emotional preambles data store 320 maps the response preambles 324 to the emotional state 318 of lonely.

In some examples, the emotion detector 312 determines whether the emotional state 318 of the user 102 indicates an emotional need before obtaining a response preamble 324. In other words, the emotion detector 312 may act as a filter to determine whether an emotionally intelligent response preamble 324 is included in the response 402. The emotion detector 312 may receive, as input, the corresponding transcription 204, and identify, as output, the emotional state 318 of the user 102. The emotional state 318 may further be defined as either a neutral emotional state 318 (e.g., calm, relaxed, bored) or a non-neutral emotional state 318 (e.g., excited, fear, anxiety). When the emotion detector 312 identifies that the emotional state 318 of the user 102 is a non-neutral emotional state 318, the user 102 may benefit from an emotionally intelligent response preamble 324 that addresses the emotional needs of the user 102. Accordingly, the preamble generator 316 generates a response preamble 324 based on the non-neutral emotional state 318 of the user 102. Conversely, when the emotion detector 312 identifies that the emotional state 318 of the user 102 is a neutral emotional state 318, the user 102 may not benefit from an emotionally intelligent response preamble 324. Here, the response generator 400 generates the response 402 without obtaining a response preamble 324.

After the emotion detector 312 determines the emotional state 318 of the user 102, the severity determiner 314 may additionally process the corresponding transcription 204 to determine a severity of the emotional state 318 of the user 102. For example, an emotional state 318 of sadness may generally encompass more than one type of sadness, such as a low severity sadness (e.g., feeling blue), a medium severity sadness (e.g., feeling sad), and a high severity sadness (e.g., feeling depressed). In some examples, the severity may be associated with a different prosody for conditioning the synthesized speech 122 generated by the digital assistant 200. Specifically, the TTS system 410 may use a prosody embedding 324 associated with the severity of the emotional state 318 of the user 102 in order to produce synthesized speech 122 with a target prosody specified by the prosody embedding 324 that is suitable for addressing the severity of the emotional state 318 of the user 102. Generally, the TTS system 410 uses the prosody embedding 324 to adjust/change prosodic features, such as fundamental frequency, duration, and/or amplitude, of the synthesized speech 122 to reflect the emotional state 318 of the user 102 when audibly outputting the emotionally relevant response 402.

Figure 4:
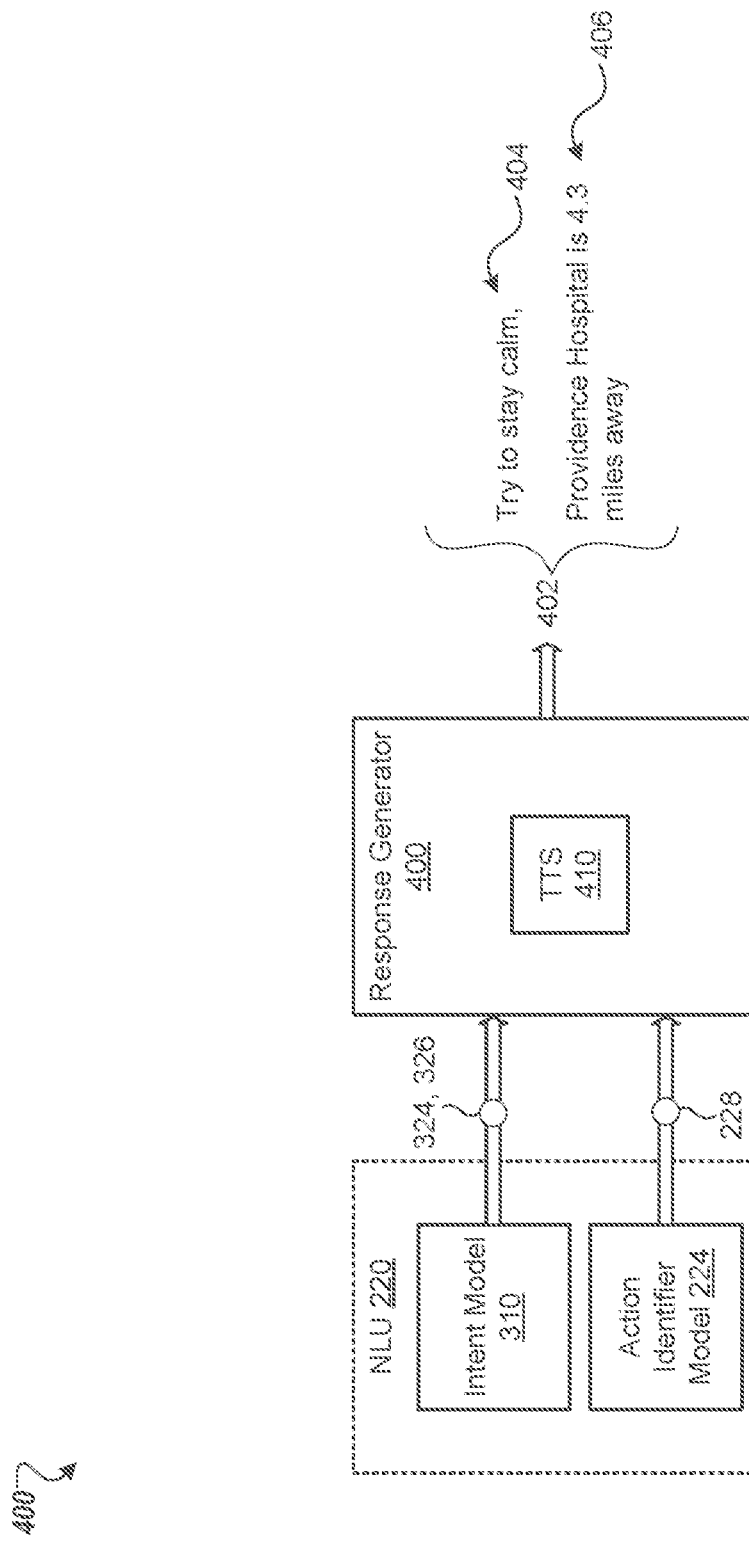
FIG. 4 is a schematic view of the response generator process.

Referring to FIGS. 2 and 4, the NLU module 220 generates, as output, the response preamble 324 based on the emotional state 318 of the user 102, and the information 228 responsive to the query 106. The response generator 400 receives the response preamble 324 and the information 228 as input and combines the response preamble 324 and the information 228 to produce a textual representation of the emotionally intelligent response 402. Specifically, the textual representation includes the response preamble transcription 404, "Try to stay calm" which addresses the emotional state 318 of the user 102, followed by the information transcription 406, "Providence Hospital is 4.3 miles away" which provides the information 228 responsive to the query 106.

In some implementations, the TTS system 410 converts the textual representation of the emotionally intelligent response 402 into corresponding synthesized speech 122 that may be audibly output from the speaker of the AED 104. When the intent model 310 generates/selects a prosody embedding 326 (e.g. the severity determiner 314 determines a severity level necessitating a soothing emotionally intelligent response), the TTS system 410 uses the prosody embedding 326 when converting the textual transcription to produce synthesized speech 122 having a target prosody specified by the prosody embedding. For instance, the resulting synthesized speech may have a prosody that is soothing and calming when the emotional state 318 is sad (especially when the severity is high), thereby conveying to the user 102 that the digital assistant 200 is cognizant of the emotional state of the user 102. In some implementations, the TTS system 410 resides on the remote system 120 and transmits audio data packets representing a time-domain audio waveform of the synthesized speech 122 to the AED 104 for audible output from the speaker 18. In other implementations, the TTS system 410 resides on the AED 104 and receives the textual representation of the emotionally intelligent response 402 (and the prosody embedding 326) for conversion into the synthesized speech 122.

Figure 5:
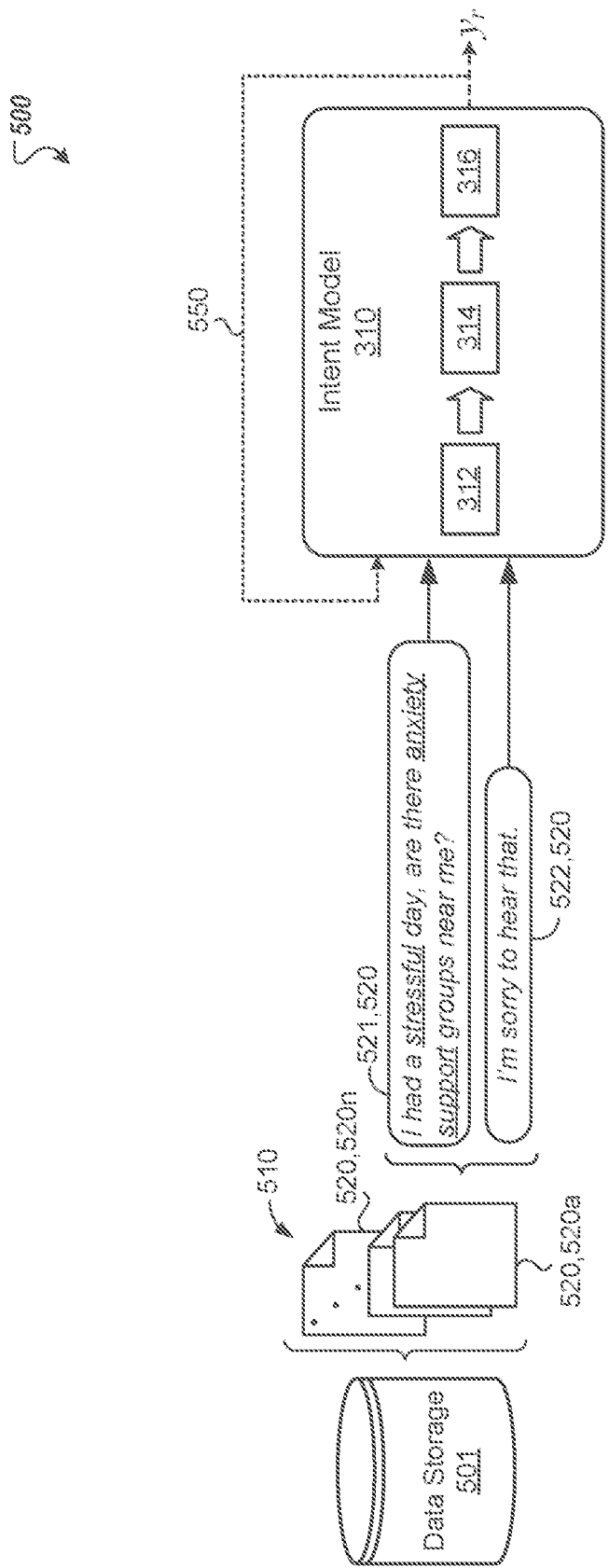
FIG. 5 is a schematic view of an example training process for promoting an intent model to learn consistent emotionally intelligent responses to information seeking questions.

FIG. 5 shows an example training process 500 for training the intent model 310 to generate a response preamble 324 based on an identified emotional state 318 of a user 102. The training process 500 may execute on the remote system 120 of FIG. 1. As shown, the training process 500 obtains one or more training data sets 510 stored in a data store 501 and trains the intent model 310 on the training data sets 510. The data store SI may reside on the memory hardware 125 of the remote system 120. Each training data set 510 includes a plurality of training examples 520, 520a-n, where each training example 520 may include an emotional state transcription 521 paired with a corresponding response preamble 522. As shown, the training example 520 includes the emotional state transcription 521 of "I had a stressful day, are there any anxiety support groups near me?" and the corresponding response preamble 522 of "I'm sorry to hear that." Simply put, the training process 500 trains the intent model 310 to learn to predict the response preamble 522 for the emotional state transcription 521.

In some implementations, each of the training examples 520 are labeled with an emotional state category corresponding to the intent level category 322 of the emotional state transcription 521 so that intent model 310 learns, through the training process 500, to generate an emotionally intelligent response preamble 324 in response to detecting an emotional state 318 associated with the labeled emotion category. In other implementations, the training examples 520 are not labeled with an emotion category. Instead, the intent model 310 predicts the emotional category of the emotional state transcription 521 by identifying one or more words in the emotional state transcription 521 that correspond to an emotion category. In these implementations, the intent model 310 may identify the words stressful, anxiety, and support in the emotional state transcription 521 and determine that the identified words indicate an emotion category of anxiety, and generate an emotionally intelligent response preamble 324 of "I'm sorry to hear that."

In the example shown, the intent model 310 receives the training example 520 as input and generates an output prediction $y_r$. The output prediction $y_r$ includes a predicted response preamble that addresses the emotional state 318 of a user 102, which is tested for its accuracy. At each time-step, or a batch of time-steps, during the training process 500, the intent model 310 may be trained using a loss function 550 based on the output prediction $y_r$ and the response preamble 324 of the corresponding training example 520 serving as ground truth.

Figure 6:
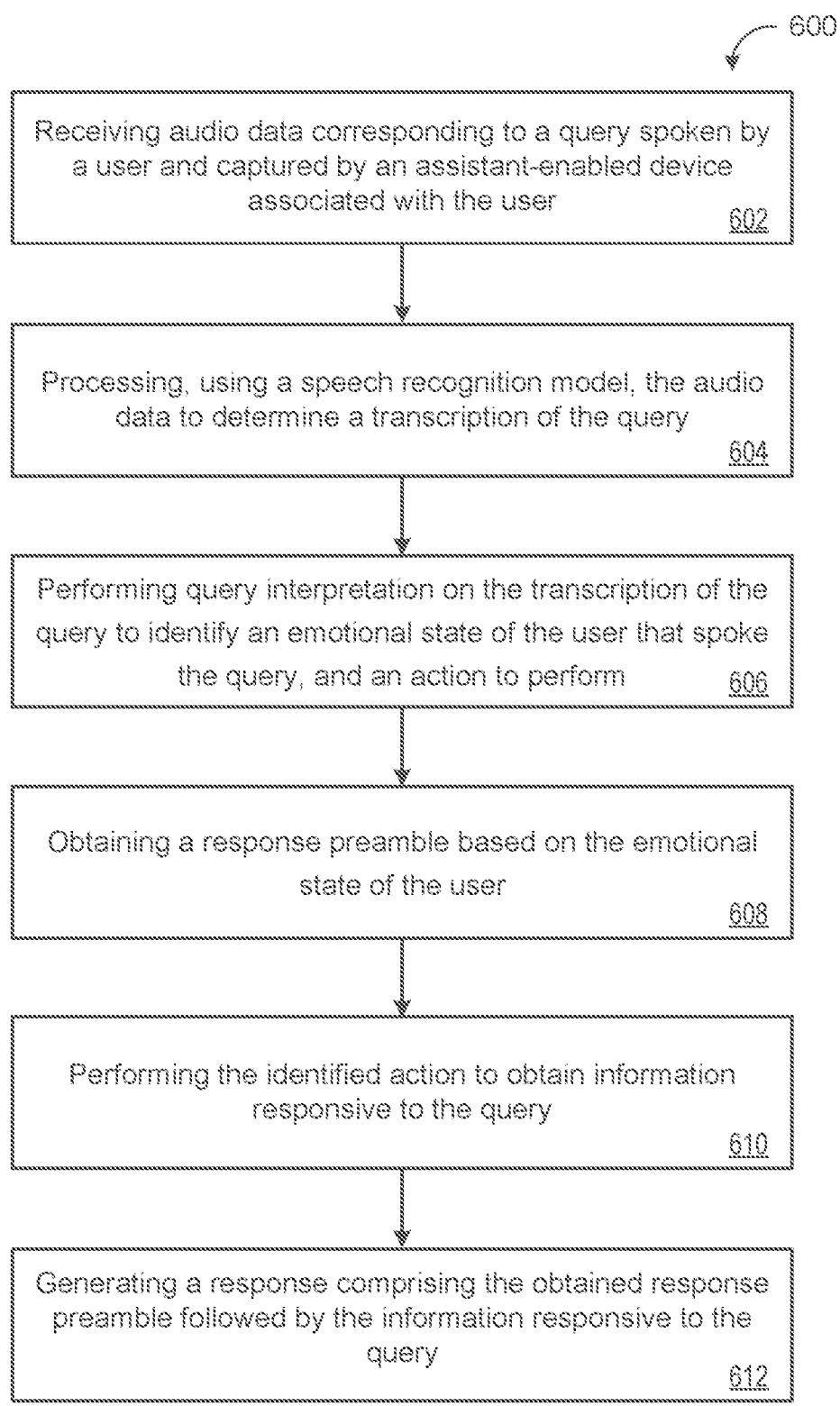
FIG. 6 is a flowchart of an example arrangement of operations for a method for generating emotionally intelligent responses to information seeking questions.
Figure 7:
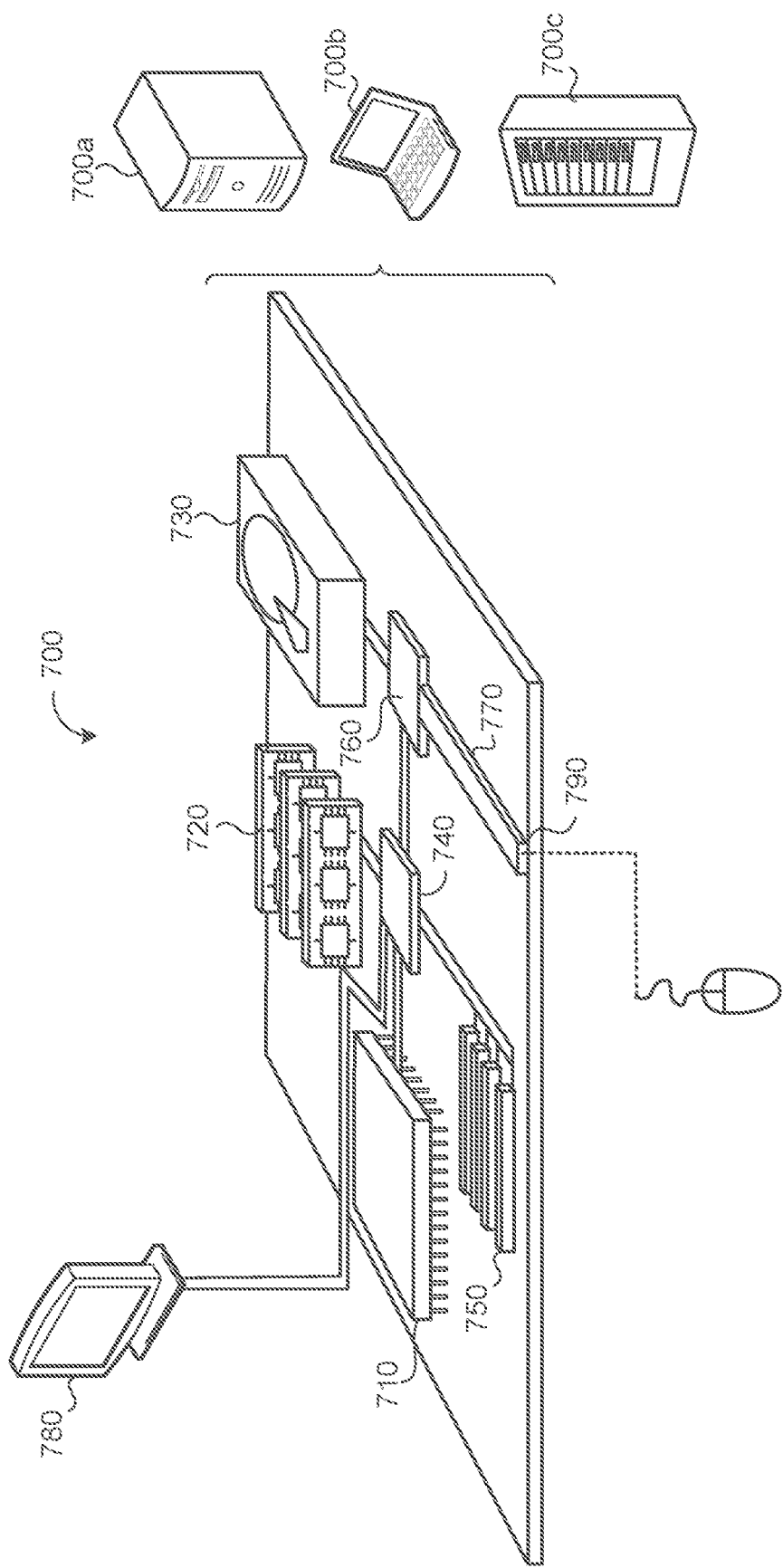
FIG. 7 is a schematic view of an example computing device that may be used to implement the systems and methods described herein.

FIG. 6 is a flowchart of an exemplary arrangement of operations for a method 600 of generating emotionally intelligent responses to information seeking questions. The method 600 includes, at operation 602, receiving audio data 202 corresponding to a query 106 spoken by a user 102 and captured by an assistant-enabled device 104 associated with the user 102. At operation 604, the method 600 includes processing, using a speech recognition model 211, the audio data 202 to determine a transcription 204 of the query 106.

At operation 606, the method 600 also includes performing query interpretation on the transcription 204 of the query 106 to identify an emotional state 318 of the user 102 that spoke the query 106, and an action 218 to perform. The method 600 further includes, at operation 608, obtaining a response preamble 324 based on the emotional state 318 of the user 102. At operation 610, the method 600 also includes performing the identified action 218 to obtain information 228 responsive to the query 106. The method 600 also includes, at operation 612, generating a response 402 including the obtained response preamble 324 followed by the information 228 responsive to the query 106.

FIG. 5 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 (e.g., data processing hardware 10 of FIG. 1) can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 (e.g., memory hardware 12 of FIG. 1) stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application." an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   receiving audio data corresponding to a query spoken by a user and captured by an assistant-enabled device associated with the user;
   processing, using a speech recognition model, the audio data to determine a transcription of the query;

performing query interpretation on the transcription of the query to identify:
an emotional state of the user that spoke the query;
an action to perform; and
a level of severity of the identified emotional state of the user;
obtaining a response preamble based on the emotional state of the user by querying, using the identified emotional state of the user, a preamble datastore comprising a set of different preambles, each preamble in the set of different preambles mapping to a different emotional state, wherein one or more of the preambles in the set of different preambles are shared by two or more emotional states;
performing the identified action to obtain information responsive to the query;
generating a response comprising the obtained response preamble followed by the information responsive to the query;
obtaining a prosody embedding based on the level of severity of the identified emotional state of the user; and
converting, using a text-to-speech (TTS) system, a textual representation of the response into emotionally intelligent synthesized speech having a target prosody specified by the prosody embedding.

2. The computer-implemented method of claim 1, wherein performing the identified action to obtain the information responsive to the query further comprises querying a search engine using one or more terms in the transcription to obtain the information responsive to the query.

3. The computer-implemented method of claim 1, wherein obtaining the response preamble based on the emotional state of the user further comprises generating, using a preamble generator configured to receive the emotional state of the user as input, a preamble mapped to the emotional state of the user.

4. The computer-implemented method of claim 1, wherein obtaining the response preamble based on the emotional state of the user further comprises determining whether the emotional state of the user indicates an emotional need.

5. The computer-implemented method of claim 4, wherein determining whether the emotional state of the user comprises an emotional need is based on content of the query.

6. The computer implemented method of claim 4, wherein determining whether the emotional state of the user comprises an emotional need further comprises determining whether the emotional state of the user is associated with an emotion category.

7. The computer-implemented method of claim 4, wherein the operations further comprise, when the identified emotional state of the user does not indicate an emotional need, generating the response without obtaining the response preamble.

8. The method of claim 1, wherein the operations further comprise processing a follow up operation based on the response.

9. A system comprising:
data processing hardware; and
memory hardware in communication with the data processing hardware, the memory hardware storing instructions that when executed on the data processing hardware cause the data processing hardware to perform operations comprising:
receiving audio data corresponding to a query spoken by a user and captured by an assistant-enabled device associated with the user;
processing, using a speech recognition model, the audio data to determine a transcription of the query;
performing query interpretation on the transcription of the query to identify:
an emotional state of the user that spoke the query;
an action to perform; and
a level of severity of the identified emotional state of the user;
obtaining a response preamble based on the emotional state of the user by querying, using the identified emotional state of the user, a preamble datastore comprising a set of different preambles, each preamble in the set of different preambles mapping to a different emotional state, wherein one or more of the preambles in the set of different preambles are shared by two or more emotional states;
performing the identified action to obtain information responsive to the query;
generating a response comprising the obtained response preamble followed by the information responsive to the query
obtaining a prosody embedding based on the level of severity of the identified emotional state of the user; and
converting, using a text-to-speech (TTS) system, a textual representation of the response into emotionally intelligent synthesized speech having a target prosody specified by the prosody embedding.

10. The system of claim 9, wherein performing the identified action to obtain the information responsive to the query further comprises querying a search engine using one or more terms in the transcription to obtain the information responsive to the query.

11. The system of claim 9, wherein obtaining the response preamble based on the emotional state of the user further comprises generating, using a preamble generator configured to receive the emotional state of the user as input, a preamble mapped to the emotional state of the user.

12. The system of claim 9, wherein obtaining the response preamble based on the emotional state of the user further comprises determining whether the emotional state of the user indicates an emotional need.

13. The system of claim 12, wherein determining whether the emotional state of the user comprises an emotional need is based on content of the query.

14. The system of claim 12, wherein determining whether the emotional state of the user comprises an emotional need further comprises determining whether the emotional state of the user is associated with an emotion category.

15. The system of claim 12, wherein the operations further comprise, when the identified emotional state of the user does not indicate an emotional need, generating the response without obtaining the response preamble.

16. The system of claim 9, wherein the operations further comprise processing a follow up operation based on the response.

* * * * *